United States Patent Office 3,280,064
Patented Oct. 18, 1966

3,280,064
HOT MELT COATING COMPOSITIONS CONTAINING PARAFFIN WAX, PETROLEUM CERESIN WAX, AND A COPOLYMER OF ETHYLENE OR PROPYLENE AND A MONOETHYLENICALLY UNSATURATED ESTER

Irving P. Hammer, Nutley, N.J., and Eugene A. Jakaitis, Syosset, N.Y., assignors to Mobil Oil Corporation, a corporation of New York No Drawing. Filed Apr. 6, 1962, Ser. No. 185,516
9 Claims. (Cl. 260—28.5)

This invention is directed to an improved plastic formulation for coating paper, cardboard, kraft board, cartons and the like and is particularly concerned with a coating composition for use in coating fibrous board useful as a container for liquids and solids.

It is current practice to package many items in paper and cartons, such as bacon, butter, margarine, milk and orange juice. In order to provide a leakproof container for these items, the package is presently coated with a layer of paraffin wax. It is well recognized that wax has outstanding resistance to water vapor transfer provided the wax coating is not disturbed. Unfortunately, however, paraffin wax is very friable, and, hence, the wax cracks under any substantial deformation. Cracks develop in the wax coating at the creases formed when the package is assembled and, unfortunately, the vapor transfer through the cracks is high.

Continuous efforts have been made through the years to improve wax formulations by refinery treatment and blending. Microcrystalline wax has been added to the paraffin wax to make the wax more ductile and less liable to rupture. Rubber, oil and lower melting waxes, such as foots wax, have been added for the same purpose. All these addition agents help, but they tend to soften the wax, giving it a dull appearance, a greasy feel and making it easy to mar or smear. The coating formed, therefore, is a soft, tacky or greasy coating. This coating is suitable for used as a laminating or intermediate coating between plies but the coating does not produce a decorative package.

An alternate approach to this problem has been to add various materials to the wax to toughen the wax. The toughened wax film would then require a greater force to rupture the film. Fischer-Tropsch wax, and polyethylene, have been added for this purpose. A tougher coating with a higher permeability to moisture vapor transfer than paraffin wax is provided with these additions. Unfortunately, the coating composition is made more brittle by the addition and, hence, the cracks are again formed with rough handling causing a loss of vapor seal at the creases of the package.

A new approach to this problem is disclosed in U.S. Patent No. 2,877,196, which covers a mixture of petroleum wax and a copolymer of ethylene and vinyl acetate. This composition has plastic properties showing high tensile strength and ductility. Paper or board, coated with this composition, shows unusual flexibility and has an excellent feel. The appearance of the coated board is excellent, the gloss is high and the composition is clear. Unfortunately, the materials separate to some extent after a period of time. This is evidence by a greasy exudation on the surface of the coated board. This is sometimes referred to as "frosting" since it has the appearance of frost formation on the board with the result that the glossy appearance is lost. The appearance of the board is definitely damaged by this exudation. The ethylene-vinyl acetate copolymers disclosed in Patent No. 2,877,196 are those copolymers having a polymerized vinyl acetate content of from about 5% to about 25% by weight, preferably from about 15% to 20% by weight. The concentration of copolymer in wax is specified as about 0.1 to about 20% by weight of the ethylene-vinyl acetate copolymer having a melt index of from about 0.5 to about 1000, preferably from about 100 to about 1000.

Various addition agents have been found which tend to inhibit the blushing or frosting of wax, vinyl acetate-ethylene copolymer blends, but these agents do not completely remove the frosting. We have found, however, that frosting can be completely eliminated by adding a sufficient amount of petroleum ceresin wax. Conventional microcrystalline wax is obtained from blends of heavy distillate oils and/or residual lubricating oils by well known solvent precipitation procedures. The wax is obtained from the solvent solution by cooling the liquid to a temperature range of about 40–60° F., producing a wax which melts at about 150–170° F. The conventional microcrystalline wax may be considered to be made up of two components, a ceresin wax component melting at high temperature and a plastic wax component melting at an intermediate temperature. The ceresin wax component is composed predominantly of normal, slightly branched paraffins, and simple cycloparaffins with long side chains. The lower melting plastic wax component is composed of highly branched and cyclic hydrocarbons of more complex structure. Conventional microcrystalline wax is composed of about 20% ceresin wax and 80% plastic wax, although the exact composition will vary to some extent with the crude source and the method of processing. By placing a microcrystalline wax in solvent solution and cooling to about 95–105° F. the ceresin component precipitates, leaving the lower melting plastic wax in solution. While the addition of ordinary microcrystalline wax to paraffin wax, vinyl acetate-ethylene copolymer blends will help in reducing the extent of blushing it will not eliminate the blushing. An addition of broadly 1 to 25% by weight ceresin wax will completely eliminate the blushing or frosting. Preferably about 5 to 20% by weight ceresin wax is added, with the smaller amount being adequate if about 10% microcrystalline wax is present in the blend.

The object of this invention is to provide an improved coating formulation for paper and carton board.

A further object of this invention is to provide an improved coating for cartons and paperboard containers.

A further object of this invention is to provide an improved coating formulation for application to paper, milk cartons, bacon wrappers and juice containers which will not crack, flake or rub-off and which will have a non-greasy feel, accompanied with a high gloss.

A further object of this invention is to provide a coating composition for paperboard having high hardness, superior water vapor transfer resistance, good flexibility, good gloss, freedom from frosting or exudation, high ductility, plastic feel, and excellent appearance.

These and other objects of the invention will be more fully disclosed in the following more detailed description of the invention.

One aspect of this invention comprises mixing copolymers formed from either ethylene or propylene with one other polymerizable organic compound having ethylenic unsaturation and wax, preferably a paraffin wax melting at about 110–150° F., for coating purposes and adding to this mixture an amount of ceresin wax to prevent blushing or frosting of the coating. The copolymer is used in the amount of broadly 1–60% by weight, but, preferably about 5–40% by weight of the copolymer wax blend. Suitable interpolymers are ethylene-vinyl acetate, ethylene-ethyl acrylate, ethylene butyl acrylate, propylene-vinyl acetate, propylene-methyl acrylate, ethylene-methyl methacrylate; for example, ethylene-vinylacetate and ethylene-ethyl acrylate interpolymers having ester contents of about 5–35% by weight and the balance ethylene. Other polymerizable organic compounds are monovinyl and divinyl esters, styrene, polymerizable esters of unsaturated mono- and polybasic acids and similar compounds. All these copolymers show varying degrees of improvement with wax as coating materials for paper or carton stock and yet show frosting to an undesirable extent even though various preventive additives are mixed with the wax, copolymer blends. Only ceresin wax, to our knowledge, will eliminate the blushing or frosting.

This invention is particularly concerned with ethylene-vinyl acetate and ethylene-ethyl acrylate interpolymers, which are unusually good interpolymers for commingling with wax to produce unusual hot melt coatings. Unfortunately, these interpolymers are particularly poor with respect to blushing or frosting.

EXAMPLE I

A particularly good coating will be formed by mixing paraffin wax melting at 133–135° F. A.M.P. with ethylene-vinyl acetate copolymer and ceresin wax melting at 195° F. The amounts to use are 50% by weight paraffin wax, 20% by weight ceresin wax and 30% by weight copolymer. The copolymer is further defined as possessing 28.5% by weight vinyl acetate and having a melt index of 15. The coating formed thereby besides having all the required characteristics of an outstanding coating for cartons and the like will be completely free from blushing or frosting.

EXAMPLE II

Another outstanding coating will be formed by mixing a copolymer of propylene-vinyl acetate (vinyl acetate contents 25% by weight) with a 150° F. A.M.P. paraffin wax and ceresin wax melting at 180° F. In this instance, mix 60% by weight paraffin wax with 25% by weight copolymer and 15% by weight ceresin wax. Once again an excellent coating will be formed completely free of frosting or blushing.

EXAMPLE III

Another fine coating will be formed by mixing a copolymer of ethylene-ethyl acrylate (ethyl acrylate content 15% by weight), paraffin wax melting at 150° F. A.M.P., microcrystalline wax melting at 165° F., and ceresin wax melting at 185° F. Mix the materials in the amount 50% by weight paraffin wax, 20% by weight copolymer, 10% by weight microcrystalline wax and 20% by weight ceresin wax. The coating produced will be completely free of exudation or blushing.

The properties of several commercially available ceresin waxes are enumerated hereinbelow in Table I as follows:

*Table I*

| Ceresin Wax | ASTM M.P., ° F. | Penetration, 100 gms./5 sec. | | Viscosity @ 210° F., SUS |
|---|---|---|---|---|
| | | @ 77° F. | @ 115° F. | |
| B | 180+ | 15.0 | ---------- | 75 |
| C | 188 | 5.5 | 15 | ---------- |
| D | 201 | 7.0 | 16.5 | 65 |
| E | 199 | 6.0 | 14 | 63 |
| F | 196 | 6.5 | 18.5 | 63 |
| G | 185 | 7.5 | 19 | 74 |
| H | 186 | 9.0 | 19.0 | 74 |

All of the waxes enumerated in Table I were found satisfactory. A ceresin wax obtained by deoiling a petrolatum from which commercial microcrystalline wax is obtained at a deoiling temperature of 95 to 105° F. instead of the customary 40–60° F. deoiling temperature used to produce microcrystalline wax was also found satisfactory. Table II shows the properties of the ceresin wax obtained from petrolatum.

*Table II*

| Deoiling Temp. | Penetration @ 100 gm./5 sec. | | ASTM M.P., ° F. | Viscosity @ 210° F., SUS |
|---|---|---|---|---|
| | @ 77° F. | @ 115° F. | | |
| 105 | 6 | 16 | 193.5 | 95 |
| 100 | 6.5 | 14.5 | 191 | 95 |
| 95 | 6.5 | 15.5 | 187.5 | 93 |

Two commercially available ceresin waxes are Wax 195–M and Wax 180–M, sold by the Sonneborn Chemical Company and possess the following properties:

| | 195–M | 180–M |
|---|---|---|
| Melting Point °F., D127 (ASTM) | 190–200 | 180–187. |
| Needle Penetration at 77° F | 10 Max | 15–20. |
| Color, Lovibond, 2" cell | 1Y | 35Y 1–2R (light yellow). |
| Viscosity at 210° F., SUS | 78–88 | 75. |
| Oil Content, Percent | 0.5 | 1.5–2.0. |

Another ceresin wax available commercially is identified as Shell 700, sold by the Shell Oil Company.

EXAMPLE IV

In order to show comparative performance of different types of wax in the prevention of frosting, a base formulation of 30% ethylene vinyl acetate copolymer and 50% 133–135° F. A.M.P. wax was mixed with 20% of the additive material. The several compositions were then dip coated onto paper board and the coated panels stored at room temperature for 184 hours. The presence of frosting was as follows:

| Additive: | Frosting |
|---|---|
| (1) Wax 180–M | None |
| (2) Wax 195–M | None |
| (3) Conventional microcrystalline wax | Yes |
| (4) Intermediate Wax A | Yes |
| (5) Intermediate Wax B | Yes |
| (6) Shell 700 | None |
| (7) Aristowax, 165 M.P. | Yes |
| (8) Fischer-Tropsch wax, FT–200 | Yes |
| (9) 133–135 A.M.P. paraffin wax | Yes |

Various examples have been presented hereinabove for the purpose of illustrating the invention. It is understood, of course, that various alternate compositions can be formed within the scope of this invention. The presentation of these specific examples is not intended as a limitation of the invention. The only limitations intended are found in the attached claims.

We claim:

1. A plastic coating composition consisting essentially of 40 to 90 percent by weight of paraffin wax, 5 to 40 percent of an interpolymer of a material selected from the group consisting of ethylene and propylene with a compound selected from the group consisting of vinyl acetate and ethyl acrylate, the content of said compound in said interpolymer being 5 to 35 percent by weight, and 15 to 20 percent by weight of a petroleum ceresin wax present in an amount sufficient to inhibit the inherent frosting tendency of the mixture of paraffin wax and interpolymer.

2. The composition of claim 1 wherein said paraffin wax has a melting point in the approximate range of 110 to 150° F.

3. The composition of claim 1 wherein said ceresin wax has a belting point in the approximate range of 175 to 200° F.

4. The composition of claim 1 wherein said interpolymer is a polymer of vinyl acetate and ethylene.

5. The composition of claim 1 wherein said interpolymer is a polymer of ethyl acrylate and ethylene.

6. The composition of claim 1 containing up to about 10 percent by weight of a microcrystalline wax.

7. The composition of claim 1 containing about 15 percent by weight of said ceresin wax.

8. The composition of claim 1 containing about 20 percent by weight of said ceresin wax.

9. A plastic composition for coating milk containers, butter cartons, bacon wrappers, and similar articles comprising:

| | Approximate percent by wt. |
|---|---|
| paraffin wax, 150° F. M. Pt. | 50 |
| microcrystalline wax, 165° F. M. Pt. | 10 |
| ceresin wax, 185° F. M. Pt. | 20 |
| and | |
| ethylene-ethyl acrylate copolymer, ethyl acrylate content of 15% by weight | 20 |

said ceresin wax being composed predominantly of normal, slightly branched paraffins and cycloparaffins having long side chains.

References Cited by the Examiner

UNITED STATES PATENTS

| | | | |
|---|---|---|---|
| 2,728,735 | 12/1955 | Anderson | 260—28.5 |
| 2,877,196 | 3/1959 | Reding | 260—28.5 |
| 3,025,167 | 3/1962 | Butler | 260—28.5 |
| 3,027,346 | 3/1962 | Rugg et al. | 260—28.5 |
| 3,060,045 | 10/1962 | Malakoff et al. | 106—270 |
| 3,155,631 | 11/1964 | Zapp | 260—28.5 |
| 3,178,383 | 4/1965 | Stout | 260—28.5 |

FOREIGN PATENTS 645,914 11/1950 Great Britain.

OTHER REFERENCES

"The Chemistry and Technology of Waxes" (Warth), Reinhold Pub. Co., N.Y., 1956, pages 421–427.

MORRIS LIEBMAN, *Primary Examiner.*

ALAN LIEBERMAN, *Examiner.*

J. W. BEHRINGER, B. A. AMERNICK, *Assistant Examiners.*